United States Patent [19]

Huang et al.

[11] Patent Number: 4,831,872
[45] Date of Patent: May 23, 1989

[54] METHOD OF MEASURING GEAR ERRORS THROUGH MESHING AND SEPARATING AND A MACHINE THEREOF

[75] Inventors: Tongnian Huang; Dengyun You; Tongjing Lu; Deyuan Kang; Rongan Duan, all of Chengdu, China

[73] Assignee: Chengdu Tool Research Institute of The State Commission for Machinery Industry, Chengdu, China

[21] Appl. No.: 194,924

[22] Filed: May 17, 1988

[30] Foreign Application Priority Data

Jan. 29, 1988 [CN] China ................. 88100521.5

[51] Int. Cl.$^4$ ........................................... G01M 13/02
[52] U.S. Cl. ................... 73/162; 33/179.5 R; 33/179.5 B; 33/179.5 C; 364/560
[58] Field of Search ............... 73/162; 33/179.5 R, 33/179.5 B, 179.5 C, 179.5 E; 364/560, 561, 562, 563

[56] References Cited

U.S. PATENT DOCUMENTS

| | | | |
|---|---|---|---|
| 3,528,286 | 9/1970 | Bergemann et al. | 73/162 |
| 3,795,143 | 3/1974 | Deprez et al. | 33/179.5 B |
| 3,921,304 | 11/1975 | Yagiela | 33/179.5 C |
| 4,336,711 | 6/1982 | Maehara et al. | 73/162 |
| 4,488,359 | 12/1984 | Misson | 33/179.5 C |
| 4,550,508 | 11/1985 | Spaeth | 33/179.5 C |
| 4,704,799 | 11/1987 | Kobetsky | 33/179.5 C |

FOREIGN PATENT DOCUMENTS

| | | | |
|---|---|---|---|
| 55-72840 | 6/1980 | Japan | 73/162 |
| 57-23835 | 2/1982 | Japan | 73/162 |
| 61-205816 | 9/1986 | Japan | 73/162 |
| 934285 | 6/1982 | U.S.S.R. | 73/162 |

Primary Examiner—William A. Cuchlinski, Jr.
Assistant Examiner—Diego F. F. Gutierrez
Attorney, Agent, or Firm—Birch, Stewart, Kolasch & Birch

[57] ABSTRACT

This invention relates to a gear error measuring method and a measuring machine thereof through meshing and separating. The error is measured and taken during the meshing engagement of a specific master gear with the measured gear. As the specific master gear with its teeth arranged according to a specific rule and a device for fixing the unified starting position on the machine are adopted, various individual errors, composite errors, three-dimensional flank form error graphs, integrated error graphs and contact morphological graphs can be measured and obtained in a measuring cycle, furthermore, the interrelationship among different individual errors and between the individual error and the composite error can be shown in the measuring result. This invention is especially applicable to the error measurement of bevel gears and hypoid gears where different errors will hardly be measured by the existing measuring method at present.

12 Claims, 11 Drawing Sheets

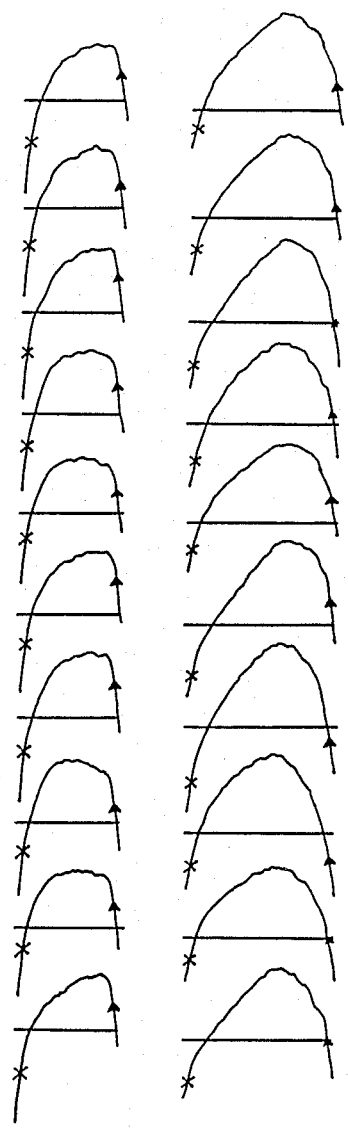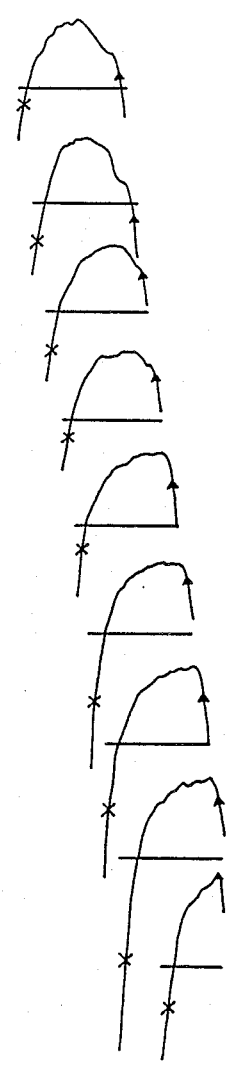
FIG. 12    FIG. 13    FIG. 14

METHOD OF MEASURING GEAR ERRORS THROUGH MESHING AND SEPARATING AND A MACHINE THEREOF

FIELD OF THE INVENTION

This invention relates to a method of measuring gear errors through meshing and separating, and a measuring machine thereof. In a cycle of measuring, this invention can measure the individual error and the composite error of gears as well as obtain the three-dimensional diagram of tooth flank form error, the integrated error diagram and the contact-morphological diagram, also can obtain the interrelationship among respective individual errors and the interrelationship between the individual error and the composite error in the measuring result. This invention is especially applicable to the error measurement of the bevel gear, the hypoid gear and other gears on which various errors will hardly be measured by other measuring method at present.

DESCRIPTION OF THE PRIOR ART

It is a well-known process to apply meshing engagement for measuring gear errors.

At present, the methods of measuring gear errors by single flank meshing engagement and the measuring machine thereof are widely used. Generally speaking, the non-uniformity error is obtained during the transmission through the processed signals given by two sensors which are co-axially mounted with the measured gear and the master gear respectively, which are meshing with each other. This error is a tangential composite error, which can represent the comprehensive result of the flank contour error and the position error with respect to different teeth. But it is impossible for these methods to obtain the individual error of the gears and the specific position where the error occurs. Also the interrelationship among respective individual errors and the interrelationship between the individual error and the composite error can not be expressed, moreover, to say nothing of knowing the moving directionality of the contact point on the flank.

It is a conventional method to use a testing machine with gears rolling on each other so as to obtain the contact pattern of gears. This is now the most popular method to control the quality of gear products, especially for bevel and hypoid gears, wherein a pair of gears with the flank colour-stained are meshed during the transmission according to a regulated position of each other and after driving, the stain with contact spots is obtained and the quality of gears is judged by the stain size, shape and position on the flank. Though this method is rather simple and direct, and efficient too, but it can only represent a single aspect of the comprehensive error of gears, i.e. the contact accuracy. This different individual errors as well as the error data cannot be obtained therefrom.

The Soviet patent No. US 599155 published a measuring method which is used on an existing tester of single flank gear engagement for measuring gear error, wherein a thin streak piece of polymeric resin with tooth form is adhered to a certain tooth flank along the direction of the tooth depth or/and a thin streak piece of polymeric resin is adhered to a certain tooth flank along the direction of the tooth breadth. The thin piece is not thicker than the backlash of the gear engagement. Then measured gear is engaged with the master gear on said single flank gear tester. After two gears meshing and rolling on each other, the tooth profile error and tooth trace error of the measured gear is obtained. But such an invention is not applicable to the error measurement where the backlash of gear engagement is small. Since the thin streak piece of polymeric resin is adhered to the gear flank, it will lead to increase the curvature radius of different point on the non-involute gear contour, accordingly theoretical measuring error is caused. Furthermore, as the polymeric membrane will be distorted while adhering and will be deformed under stress while meshing, so additional undue error will be caused. Such an inveition can only roughly measure the gear tooth profile and tooth trace error, but cannot measure any other individual errors and composite errors, and can neither obtain the interrelationship among respective errors.

In the late seventies, with the use of coordinate measuring machine, the complicated curved surfaces can be measured by applying point position measurement and continuous scanning measurement, the problem of measuring the tooth surface of cylindrical, bevel and hypoid gears can be solved accordingly, and also the three-dimensional diagram of tooth flank forms thereof can be obtained. But only single individual gear can be measured using the coordinate measuring machine and the measurement cannot be carried out during the meshing process. So only the individual error can be obtained. Furthermore, different from the cylindrical (involute) gear, the bevel and hypoid gears have no unified theoretical curved surface which can only be obtained through complicated calculation by the specific operational method and the particular machining parameters. If the coordinate measuring machines are used to measure these two kinds of gears, the construction and software thereof must be very complicated, and consequently, the cost will be high and the efficiency will be very low, and the reliability and accuracy of measurement are limited too.

OBJECT OF THE INVENTION

The purpose of present invention is to overcome the above-mentioned deficiencies. It provides a method of measuring gear errors through meshing and separating and a measuring machine thereof for various transmitting gears, especially for bevel and hypoid gears, of which various errors could hardly be measured by the existing measuring methods at present. This method and the machine are provided to measure errors while the measured gear is meshing and mating with the master gear. In present invention a specific master gear with its teeth arranged according to a peculiar rule and a device for a fixed starting position are adopted, so the different individual errors, the composite errors, the three-dimensional diagram of tooth flank form error, the integrated error diagram and the contact morphological diagram can all be measured and obtained in a measuring cycle. What is more, the interrelationship among various individual errors and the relationship between the individual error and the composite error can be expressed in the measurement. This invention can systematically and comprehensively provide the error information of gears as well as the accurate error curve and error data. Then why and where the error was caused can be analysed, and consequently it is helpful to guide the gear machine setting changes, to analyse the deformation after heat treatment, and to promote the productivity of gear processing and to control and improve effectively the quality of gear products.

SUMMARY OF THE INVENTION

In the method of measuring gear error through meshing and separating described in the invention, first of all, the measured gear is mounted on driving spindle of the measuring machine as the driving gear, and the specific master gear is mounted on driven spindle as the driven gear, (or alternatively interchange the two gears in mounting) so as for these two gears to be mating with each other in motion. Then, the measuring datum starting point is fixed to make sure of the specific master gear to be in the correct circumferential position. Now, the driving spindle is driven and then the driven spindle is rotated too, as the two gears are engaging with each other. If the two gears were ideal without errors, said two spindles would rotate in a constant speed ratio without any change; if the two gears are not ideal but with errors, the speed ratio of the two spindles will vary a little, then the two angular displacement sensors which respectively and co-axially mounted with the two gears will be affected and error signals will be produced. The signals are coverted through the error signal processing device and then will be synthesized into the non-uniformity errors of the rotating angle. Then available elements of the above-described errors signals are separated out and stored into the data processing system and combined to make output of the error element, so as to obtain the different error information of the gear.

The measuring machine using the method of measuring gear errors by meshing and separating described in this invention comprises a specific master gear which should engage with the measured gear, and said specific master gear and the measured gear are mounted on the one ends of the driving and the driven spindles respectively, while on the other ends of the two spindles two sensors are respectively mounted for collecting error signals of the two gears during transmission. The two sensors are respectively connected to the measuring control unit and the corresponding devices for errors signal processing, graphs output and data output.

The teeth of the specific master gear in this invention comprise, according to their flank features, a kind of transmitting gear teeth and at least one kind of measuring gear teeth.

The number of the transmitting gear teeth is more than one therein. They are arranged alternatively with the measuring gear teeth in order on the gear circumference, so as for each measuring gear tooth to join in effective measuring engagement without any mutual interference and to make sure that the contact ratio of the teeth is not more than one during the measuring engagement. There is no projecting narrow land on the flank of the transmitting tooth and the tooth thickness thereof is thinned to such a degree that only driving action is affected but without any interferring with the measuring engagement.

There are three kinds of measuring gear teeth on the specific master gear. They are as follows:

One kind thereof is the class A measuring gear teeth which reserve the complete tooth surface as the datum gear flank.

Another is the class B measuring gear teeth which possess a complete projecting narror land of the tooth profile with the solid construction of the tooth.

The third is the class C measuring gear teeth which Possess a complete projecting narrow land of the tooth trace with the solid construction of the tooth.

Among them, the number of the class B measuring teeth may be one or more than one. In case of more than one, the projecting narrow land of the tooth profile on different teeth may take different positions along the teeth breadth so as to separate the teeth flank into different teeth profile lines on different sections for measuring the tooth profile errors.

Among them, the number of the class C measuring gear teeth may be one or more than one. In case of more than one, the projecting narrow land of the tooth trace on different teeth may take different positions along the teeth depth, so as to separate the teeth flanks into different teeth trace lines at different tooth depth for measuring the tooth trace errors.

Other than the projecting narrow land reserved, the rest flank parts of the classes B and C measuring teeth as well as the flank of the transmitting teeth D can be treated by well-known mechanical or electrical or chemical processes or the process combined of them.

In a whole measuring cycle, the available error signals are produced in the course of meshing engagement between the said measuring teeth of specific master gear and the teeth of the measured gear, which form the individual elements of non-uniformity error of the rotating angle. The transmitting teeth and the measuring teeth of the specific master gear are alternatively distributed on a circumference. The error signals produced by the engagement between transmitting teeth and the teeth of the measured gear will be unavaible signals. When the number of teeth of the measured gear and the number of that of the specific master gear as well as the order for arranging the teeth of the specific master gear are all determined, also the starting position of the measuring datum point is fixed, the available error signals mentioned above will be regularly and non-continuously distributed among the non-uniformity errors of the rotating angle. Ths regularity is specific and concrete. A programme is arranged in the data processing device, based on which the elements of available error signals will be separated and assorted and then stored according to the serial number of the teeth of the measured gear and the particular arrangement of the specific master gear which comprises claisses A, B and C measuring teeth. Then the said assorted and stored error elements will be converted and combined into data graphs for output, accordingly various error data and error curve diagrams are obtained.

The measuring machine for measuring gear errors by meshing and separating method described in this invention detects and measures the error during the meshing engagement of a pair of gears. As a specific master gear with teeth arranged according to a peculiar rule is used with this measuring machine, so the order of the errors separated from the course of meshing engagement is specific too. The control and data processing system in this invention processes data just according to this specific order. So in order to carry out the measuring method of this inventin, not only a sepcific master gear, but also a device for fixing the starting datum point are needed. If the measuring starting point varies, consequently the measuring sequence will change; if the zero value of the error varies, the magnitude of the error value will change too. Thus the measuring machine which originally works well according to a normal program, when the specific master gear is remounted to it or the measurement is made repeatedly for many times, will not work normally or will obtain incorrect measuring results because of the variation of the measuring starting point. So, to set a fixed starting datum point with respect to the circumferential phase of the specific master gear is a peculiar feature of this measuring method and this measuring machine which is different from other measuring instrument working during engagement. Different ways, e.g. through mechanical, electrical (photoelectrical or electro-magnetic) mediums or combining all of these, can be adopted to realize what described above. It is essential that in remounting the specific master gear or making repeated measurement for many times, whenever the control and data processing devices receive signals and give instructions to the measuring machine to start sampling for measurement, it is necessary to make the specific master gear to give signals from a certain specific circumferential position of the said specific master gear, or from the spindle on which the said specific master gear is mounted, or from the sensor on that spindle; and to make sure that the spindle and the sensor will be fixed to the said specific master gear corresponding to the circumferential position, or data pocessing will be used to fix the circumferential phase difference between them.

BRIEF DESCRIPTION OF DRAWINGS

The method and the machine carried out the invention will now be described in detail by way of the embodiments only and with references to the accompanying drawings in which:

FIG. 12 is a curve diagram illustrating the tooth profile error of the measured hypoid gear teeth.

FIG. 13 is a curve diagram illustrating the tooth trace error of the measured hypoid gear teeth.

FIG. 14 is a curve diagram illustrating the tooth profile errors across multisections on a single tooth of the measured hypoid gear.

DETAILED DESCRIPTION OF THE PREFERRED EMBODIMENTS

Figure 1:
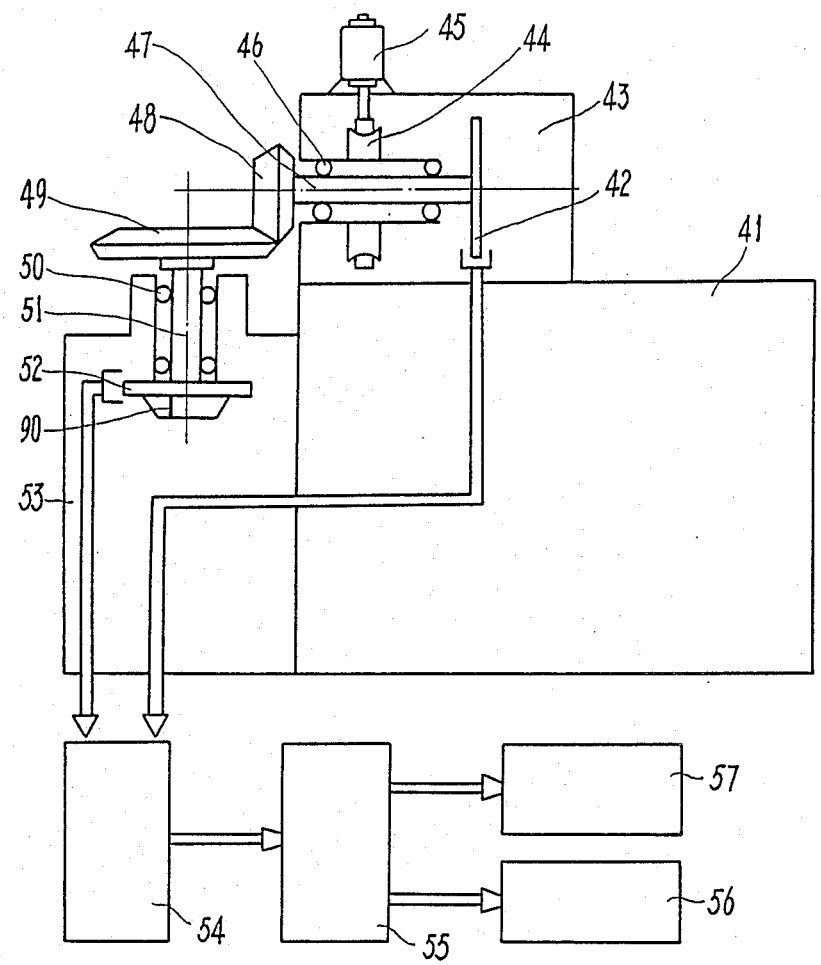
FIG. 1 is a sketch illustrating the construction of the measuring machine for measuring errors of bevel gears and hypoid gears through meshing and separating.

FIG. 1 is a sketch showing the meshing and separating method for measuring the bevel and the hypoid gears. The base assembly (41) supports the measuring machine. Two slide carriages (42, 53) are mounted on the base assembly (41). There are bearings (46, 50) for the two spindles (47, 51) mounted on these two slide carriages (43, 53). The driving spindle (47) and the driven spindle (51) are respectively mounted in these bearings (46, 50) of the two slide carriages. The measured gear (48) is mounted on one end of the driving spindle (47) and on the other end of the driving spindle (47) is the grating angular displacement sensor (42) for collecting the error signals during transmission. The numeral (90) represents the mark line on the spindle for fixing the starting datum point. The specific master gear (49) is mounted on on end of the driven spindle (51), and on the other end thereof an angular displacement sensor with gratings (52) is mounted for collecting the error signals during transmission. The motor (45) drives the driving spindle (47) to rotate through the transmission unit (44). Through the meshing engagement of the specific master gear (49) with the measured gear (48), the driven spindle (51) rotates too. The two sensors (42, 52) located respectively on the other ends of the two spindles (47, 51) convert the rotating angles of the measured gear (48) and the specific master gear (49) respectively into optical signals. In the angular displacement sensors (42, 52), the optical signals are converted into A.C. electrical signals at first, and then two channels of the electrical signal are sent into the error signals processing device (54), through amplifying and waveshaping to become electrical pulse signals, and then the frequencies of these signals are divided. In the ideal case, with the perfect gears, the two spindles (47, 51) will relatively and uniformly rotate according to a certain proportion, consequently the two channels of electrical pulse signals will come into signals of the same frequency with only an original phase difference unchanged. When errors occur to the flank form or the mutual position of the measured gear teeth (48), the two channels of pulse signals will vary with respect to the phase difference between the pulse edges. This kind of phase difference is converted into numerical signals, then the said signals are sent into the electronic computer (55), thus the non-uniformity error of the rotating angle caused by the error of the measured gear (48) can be obtained. These errors are stored and processed in the electronic computer (55) which gives instructions to the numerically controlled multi-colour plotter (56) for drawing out different error curves, and to the printer (57) for printing out corresponding error data.

The measured gear (48) in this embodiment is a hypoid gear with module of 5.2 mm and with teeth number of 10. The specific master gear (49) is a hypoid gear with module of 5. 2 mm and teeth number of 37. The small end radius of the tooth of said specific master gear is 96 mm; the large end radius thereof is 128 mm. The 37 teeth are serially numbered as 1, 2, 3, ... 37 (referring to FIG. 6) in the clockwise directin. The said specific master gear (49) has its teeth in four classes.

Figures 1, 3:
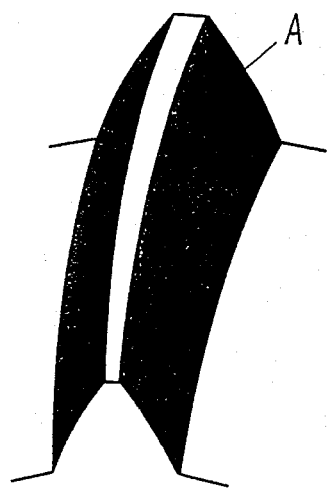
FIG. 3 is a sketch illustrating the construction of the transmitting teeth and measuring teeth of the specific master bevel gear or the specific master hypoid gear.
Figures 2, 3:
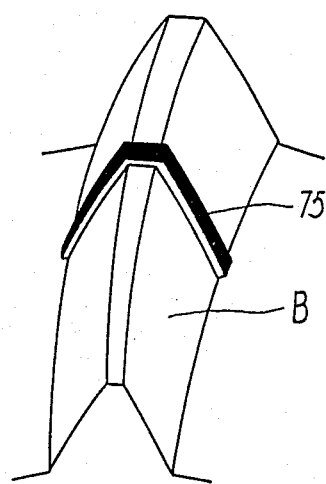
Figure 3:
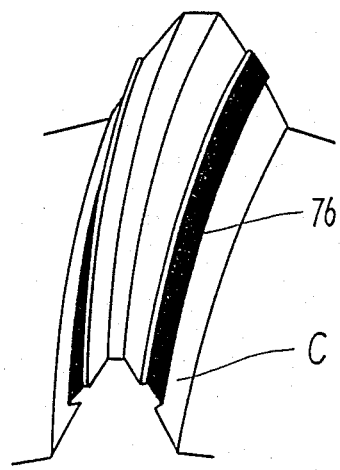
Figure 6:
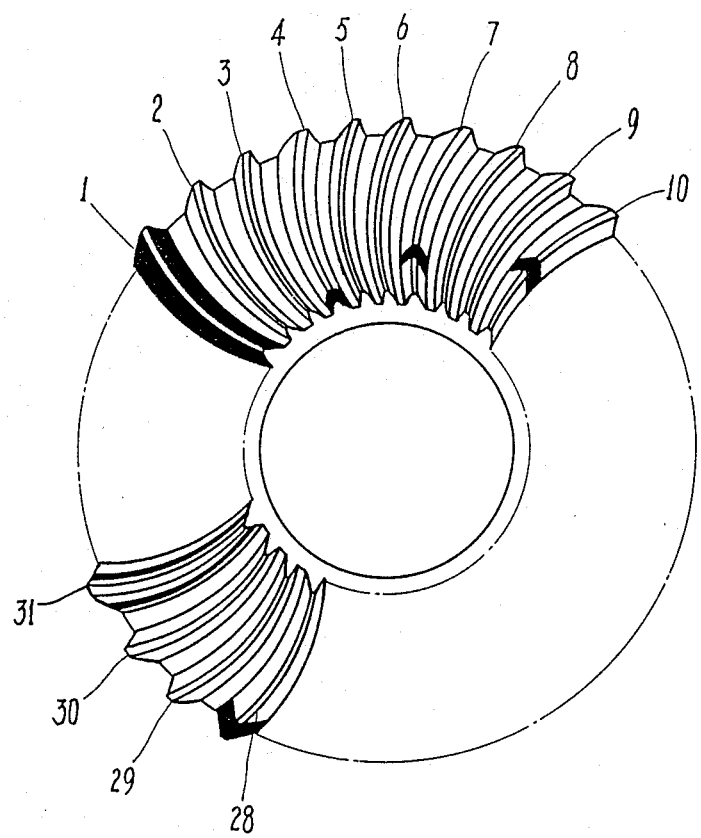
FIG. 6 is a sketch illustrating the distribution of the transmitting and measuring teeth on the circumference of the specific master hypoid gear.

Referring to FIG. 3 and FIG. 6, the FIG. 3-1 illustrates the class A measuring tooth, i.e. the tooth with reserved complete flank. There is only one class A tooth in this embodiment i.e. the No. 1 tooth as shown in FIG. 6.

Figure 2:
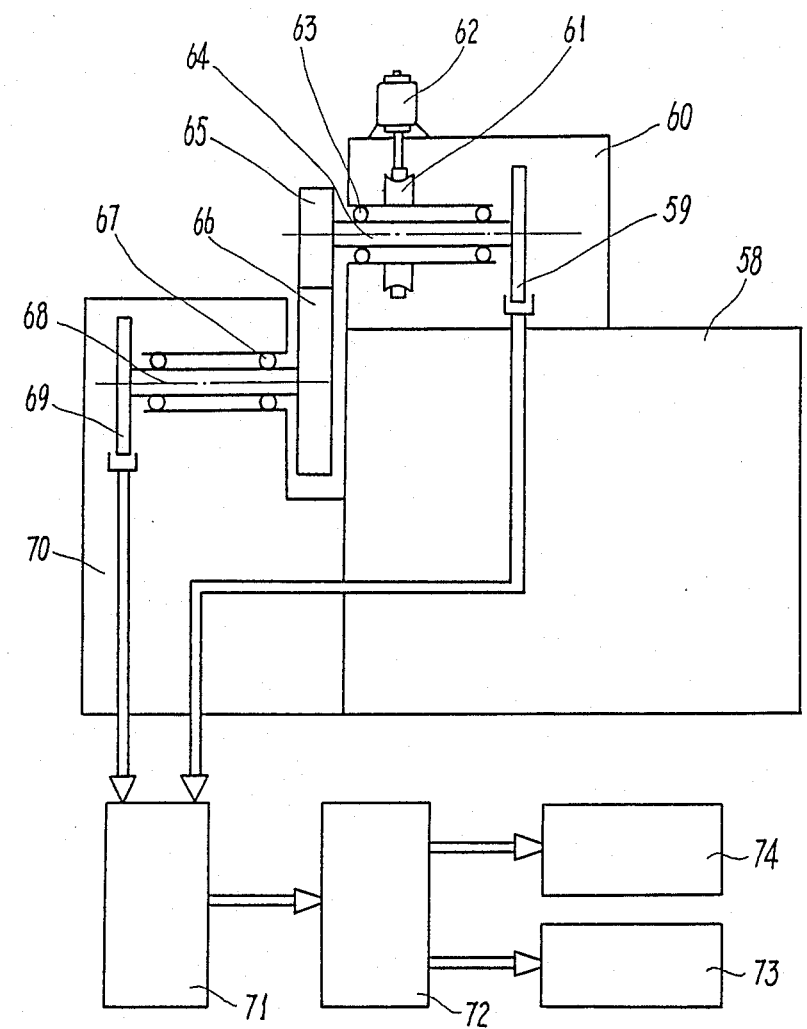
FIG. 2 is a sketch illustrating the construction of the measuring machine for measuring the error of cylindrical gears through meshing and separeting.

As shown in FIG. 3-2, it is the class B measuring tooth, i.e. the tooth with a complete projecting narrow land of the tooth profile with the solid construction of the tooth (75). There are 9 class B measuring teeth in total in this embodiment i.e. as shown in FIG. 6, Nos. 4, 7, 10, 13, 16, 19, 22, 25, and 28 are all class B measuring teeth. Among them along the direction of tooth breadth, No. 4 tooth has a projecting narrow land of the tooth profile located at the position of 96 mm from the centre of the gear; No. 28 tooth has a projecting narrow land of the tooth profile located at the position of 128 mm from the centre of the gear, and the other teeth are distributed uniformly spaced 4 mm with one another from the position of 100 mm to 124 mm from the centre of the gear.

It is the class C measuring tooth as shown in FIG. 3-3, i.e. the tooth with a complete projecting narrow land of the tooth trace (76) with the solid construction of the tooth. There is only one class C measuring tooth, i.e. the tooth No. 31 as shown in FIG. 6.

Figures 3, 4:
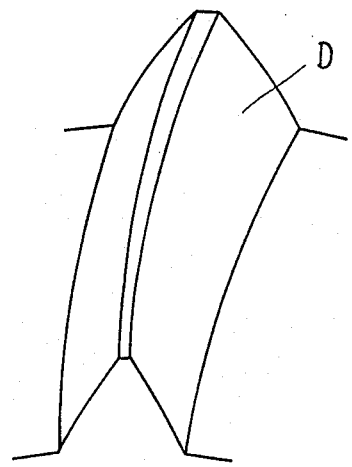
FIG. 4 is a sketch illustrating the construction of the transmitting teeth and the measuring teeth of the specific master cylindrical gear.
Figures 1, 4:
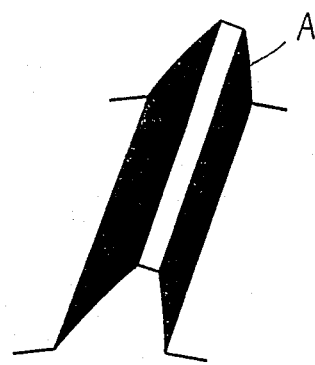
Figures 2, 4:
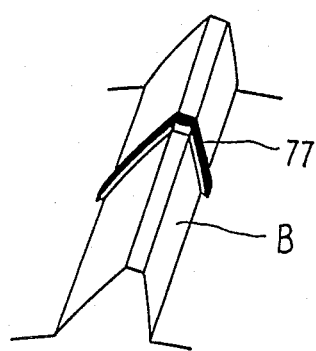
Figures 3, 4:
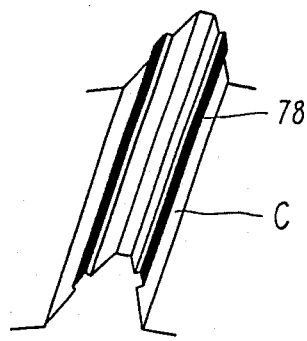
Figure 4:
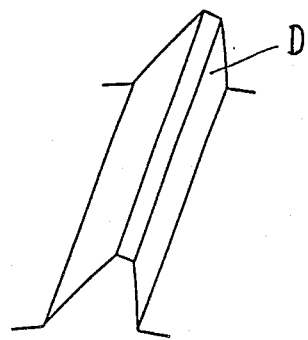

It is the class D transmitting tooth as shown in FIG. 3-4, i.e. the tooth without any narrow land on the flank, and with its thickness thinned to such a degree that only transmitting function is effected, but without interfering other measuring teeth in meshing engagement. In present embodiment there are 26 class D transmitting gear teeth i.e. as shown in FIG. 6, Nos. 2, 3, 5, 6, 8 ... 37, etc. with their tooth thickness thinned for 0.8 mm.

Figure 5:
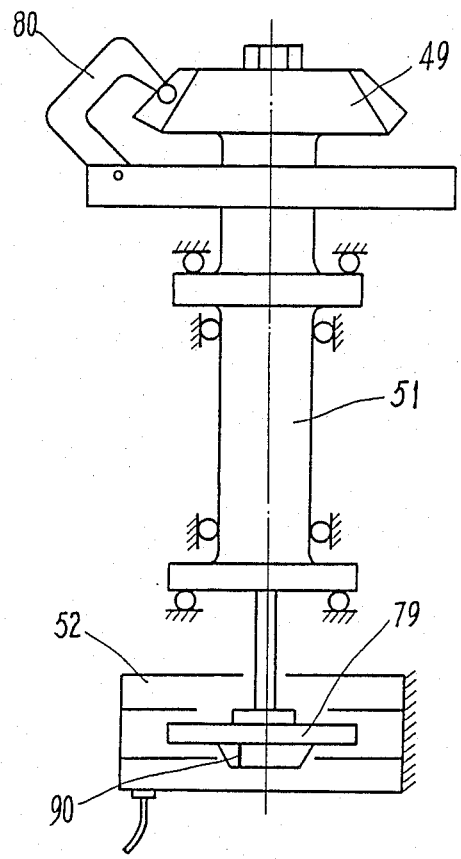
FIG. 5 is a sketch illustrating the construction of the device to set the starting datum point on the measuring machine for measuring the error of bevel gears and hypoid gears through meshing and separating.

FIG. 5 illusrates device for unifing and fixing the starting position, set in this embodiment. In this device, the grating disk (79) of the grating angular displacement sensor (52) is mounted in the lower end of the spindle (51), and the grating disk (79) may rotate simultaneously with the spindle (51). The mutual circumferential position between said grating disk (79) and the spindle (51) is fixed. There is a zero position mark on the grating disk (79) which gives a zero position signal per revolution. On the upper end of the spindle (51), a tooth setting gauge (80) which has a fixed position with respect to the circumferential position of the spindle (51) is mounted. When first for mounting the specific master gear (49), its circumferential position should be so adjusted that the No. 1 tooth of the specific master gear (49) enters into meshing engagement and starts to measure after the zero position signal is given by the grating angular displacement sensor (52). At the same time, the probe of the tooth setting gauge (80) is inserted into the tooth groove of the specific master gear (49) and is contacted with both flanks of the adjacent two teeth. When remounting the specific master gear (49), the probe of the tooth setting gauge (80) should be still inserted into the same original tooth groove. Thus, the starting point and the data processing zero position sampled by the electronic computer (55) will be the same and fixed.

In order to obtain the complete error information of the measured gear (48), it is necessary to carry out an overall measruing cycle, i.e. the measured gear (48) rotates 37 revolutions and the specific master gear (49) rotates 10 revolutions. The measured gear (48) has 10 teeth numbered as a, b, c, d, ... j in order. In the first revolution of the measured gear, these ten teeth thereof come into meshing engagement respectively with Nos. 1 to 10 teeth of the specific master gear (49), i.e. tooth "a" of measured gear meshing with tooth No. 1 of the specific master gear, "b" with No. 2, ... "j" with No. 10. In the second revolution of the measured gear (48), these ten teeth come into meshing engagement respectively with Nos. 11 to 20 teeth of the specific master gear, i.e. tooth "a" meshing with tooth No. 11, "b" with No. 12, ... "j" with No. 20. Through such corresponding meshing engagement, in an overall measuring cycle there wil be 370 pairs of teeth into meshing engagement while the measured gear (48) rotates 37 revolutions. Among the said four classes of teeth of the specific master gear (49), class A comprises 10 pairs of meshing teeth, claimss B comprises 90 pairs, class C comprises 10 pairs. The error information sent by the meshing engagement of classes A, B and C will be all available information representing the error of the measured gear (48). For example, when tooth "a" of the measured gear (48) is meshing with tooth No. 1 of the specific master gear, the error information on the whole flank of tooth "a" will be obtained. Accompanying the meshing transmission, tooth "d" is meshing with tooth No. 4, thus, the tooth profile error information at the small end section of tooth "d" of the measured gear (48) will be obtained. When the measured gear (48) is rotating to the third revolution, its tooth "h" is meshing with tooth No. 28, thus, the tooth profile error information at the large end of tooth "h" of the measured gear (48) will be obtained. When the measured gear rotates to the fourth revolution, its tooth "a" is meshng with tooth No. 31 of the specific master gear, thus, the tooth trace error information of tooth "a" will be obtained, and so on. In an overall measuring cycle, besides above-mentioned 110 pairs of meshing teeth with available measuring information, there are another 260 pairs of meshing teeth with class D teeth of the special master gear that are with unavailable information. Such information will not be stored and processed by the computer (55). Now it can be seen that the special error information of the teeth of a special measured gear (48) will be taken at a fixed, sequence position in the overall measuring cycle, when the teeth number of the measured gear (48) and teeth number of the specific master gear (49) are fixed as well as the construction parameters of the specific master gear (49) are fixed. An electronic computer programme is edited by applying the well-known computer software which is applicable to assorting purpose so as to classify the three classes, i.e. 110 groups of available informations in total, into 10 units according to the sequence number of teeth of the measured gear (48). Then, according to the classes A, B and C measuring teeth of the specific master gear (49), said each unit will be devided into 11 elements, so all of these available informations are stored into their corresponding addresses on the basis of the rotating angle of the measured gear, thus the measuring sampling process is accomplished.

An electronic computer programme is edited according to the well-known transmission principle of hypoid gears as well as the universal definitions of the three-dimensional error of the gear tooth flank, the contact spots during tooth flank meshing, the integrated gear error, the gear tangential composite error, the tooth profile error and the tooth trace error, so as to combine and process the available informations in above-mentioned addresses, to instruct the numerically controlled multi-colour plotter (56) to draw out differnt error graphs of the measured hypoid gear (48), and to instruct the printer (57) to output the corresponding error data.

Figure 7:
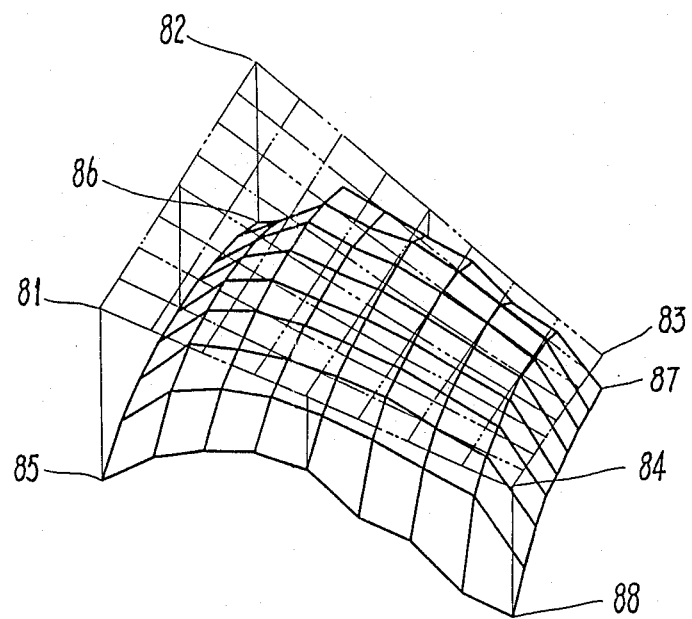
FIG. 7 is a three-dimensional diagram illustrating the single flank form error of a measured hypoid gear.

FIG. 7 is a three-dimensional graph illustrating the single tooth flank form error of the hypoid gear in this embodiment. The trapezoidal plane therein formed by the lines as shown by 81, 82, 83, 84 represents the ideal tooth flank resulted from uniform transmission. A three-dimensional graph of curved surface is formed by the deflected lines shown by 85, 86, 87, 88. The magnitude of errors at different places is represented by the corresponding distances between the said curved surface and the above described ideal tooth flank plane.

Figure 8:
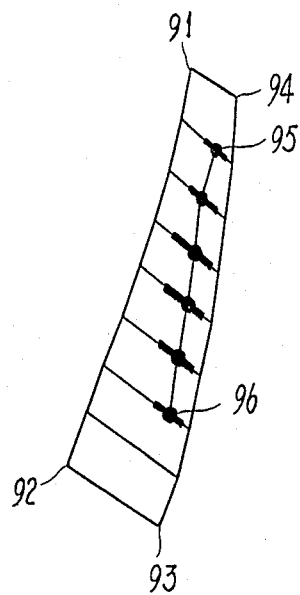
FIG. 8 is a diagram illustrating the meshing contact morphology of the flank of a measured gear.

FIG. 8 is a graph illustrating the contact morphology of tooth flank meshing of the hypoid gear in this embodiment. The outer contour of the graph (91, 92, 93, 94) is a developed tooth flank with nine traverse lines from the large end to the small end. Among them, the bold black lines on the third to the eighth horizontal lines represent the contact spots on the six cross sections. The deflected line (95, 96) shows the directional line of the contact points moving on the tooth flank.

Figure 9:
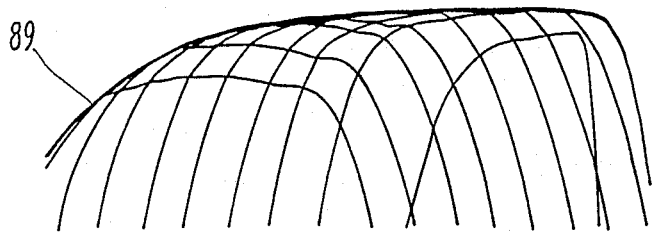
FIG. 9 is a curve diagram illustrating the single tooth integrated error of a measured hypoid gear.

FIG. 9 is curve diagram illustrating the single tooth integrated error, from the left to the right in sequence are the tooth profile error curves on different cross sections from the large end to the small end of the tooth. Their envelope curve (89) represents the transmission error curve of the whole flank. This diagram also shows the relationship between the tooth profile errors on different cross sections and the transmission error of the whole flank and the relationship among the tooth profile errors on various cross sections.

Figure 10:
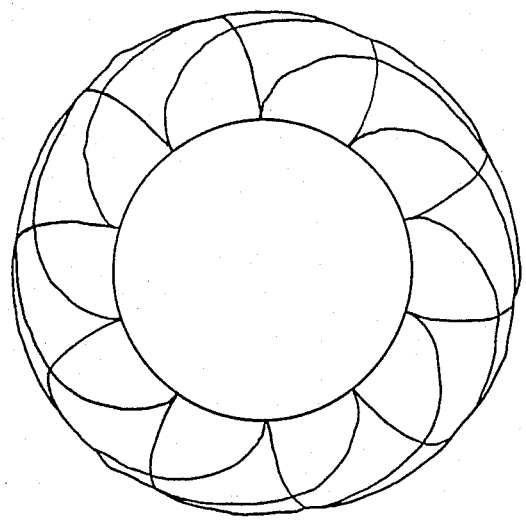
FIG. 10 is a curve diagram illustrating the tooth flanks integrated error of a measured hypoid gear.

FIG. 10 is a curve diagram illustrating the tooth flank integrated error, which shows the interrelationship among the ten tooth flank transmission errors and how the total tangential composite error of the gear is formed.

Figure 11:
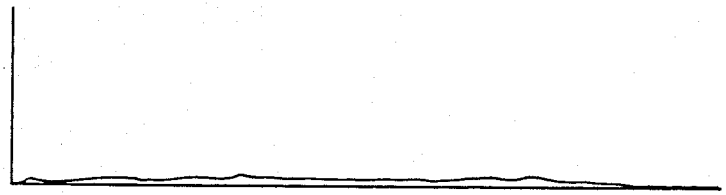
FIG. 11 is a curve diagram illustrating the tangential composite error of a measured hypoid gear.
Figure 15:
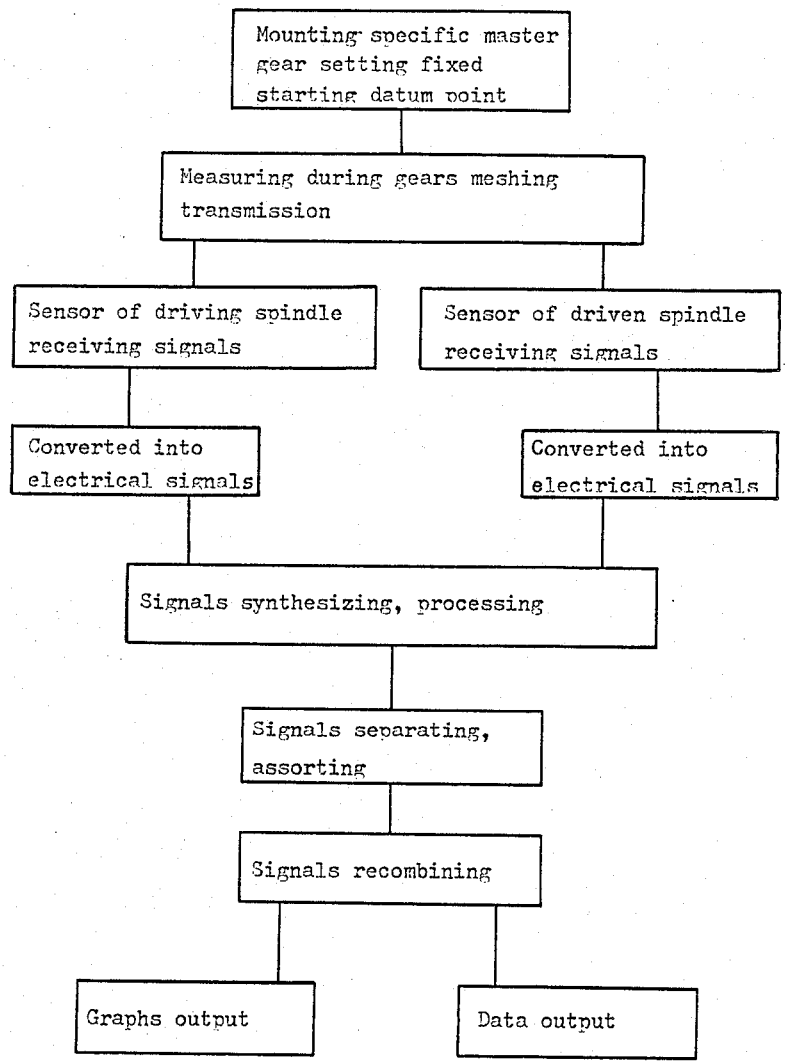
FIG. 15 is a chart illustrating the measuring programme for the gear error measurement through meshing and separating.

FIG. 11 is a curve diagram of tangential composite error showing the tangential composite errors, tangential tooth to tooth composite errors and the periodic errors.

FIG. 12 is a curve graph of the profile errors of different teeth, showing from the top to the bottom that the tooth profile errors at the middle cross section of all the ten teeth of the measured gear (48).

FIG. 13 is a curve graph of the tooth trace error of defferent teeth, showing from the top to the bottom that the tooth trace errors at the middle section of the tooth depth of all the ten teeth of the measured gear (48).

FIG. 14 is a curve graph of the single tooth profile error across multisections, showing from the top to the bottom that the tooth profile errors at nine cross-sections from the large end to the small end of an appointed tooth on the measured gear (48).

By measuring the measured gear (48) both before and after the heat-treatment and comparing the results, the information obtained can be used to analyze the deformation caused by heat-treatment, to supervize and improve the process, to guarantee the manufacturing quality of the products. For promoting the transmission quality of hypoid gears, it is necessary in production to adjust the operational parameters of the machine tool. By measuring the gear produced before and after the adjustment of the operational parameters, and comparing the measuring results, the information obtained therefrom can be used to analyze the influence of that certain parameter on error, thus to guide the adjustment of machine tool's operational parameters so as to increase the productivity, efficiently control and promote the quality of gear products.

FIG. 2 shows another embodiment of this invention, i.e. measuring the cylindrical gear by meshing and separating measurement. The measuring machine comprises a base assembly (58) for supporting the measuring machine. Two slide carriages (60, 70) are mounted on the base assembly (58). Bearings (63, 67) are mounted on the slides (60, 70) for fixing spindles (64, 68). The driving spindle (64) and the driven spindle (68) are parallel with each other which are mounted in the bearings (63, 67) respectively. On one end of the driving spindle (64) the measured cylindrical gear (65) is mounted, and on the other end thereof a grating angular displacement sensor (59) is mounted for collecting the error signals during transmission. On one end of the driven spindle (68) the specific master cylindrical gear (66) is mounted, and on the other end thereof a grating angular displacement sensor (69) is mounted. The motor (62) drives the driving spindle (64) to rotate through the transmission unit (61), and then drives the driven spindle (68) to rotate through the meshing engagement of the measured cylindrical gear (65) with the specific master cylindrical gear (66). In the same way, throgh the two sensors (59, 69) located on the other ends of these two spindles, the rotating angles of the measured gear (65) and the specific master gear (66) are respectively converted into optical signals, furthermore, into electrical signals and sent into the interface (71) of the computer (72), the data therefrom are processed by the computer (72) and the measured result will be obtained through the graph output unit (73) and the data output unit (74).

FIG. 4 shows the four kinds of tooth construction of a specific master cylindrical gear.

FIG. 4-1 is a class A measuring tooth with the whole surface of the tooth flank reserved.

FIG. 4-2 illustrates a class B measuring tooth with a complete projecting narrow land (77) of the tooth profile on the flank with the solid construction of the tooth.

FIG. 4-3 shows a class C measuring tooth with a complete projecting narrow land of the tooth trace on the flank with the solid construction of the tooth.

FIG. 4-4 shows a transmitting tooth without any narrow land on the flank and with its thickness thinned to such a degree that only transmission is effected, but without interferring the measuring teeth in joining the effective measuring engagement.

The principle and the method of measuring bevel gears and hypoid gears are the same with measuring cylindrical gears. The main difference between the two embodiments described above consists in the difference of the position for two spindles. The constructions and the complicated degrees of the slide carriages (43, 53) or (60, 70) are quite different for carrying out various objects. For cylindrical gears, it is essential to adjust the centre distance between measured gear and the specific master gear; for nimble measurement, the axial adjustment may be added. For normal bevel gears, the adjustments must be respectively made along axial directions of two spindles. For the hypoid gears with non-normal shaft angle, it is necessary to adjust in two axial directions and to adjust the mutual offset of the two spindles as well as to adjust the intersecting angle of the two spindles, etc.

In the said meshing and separating measurement, the mounting position of the measured gear (48, 65) and the specific master gear (49, 66) can be interchanged with each other, i.e. the specific master gear (49 or 66) is mounted on the driving spindle, the same error measuring result will be obtained as well.

The hypoid gear transmission is one of the most complicated gear transmission. The bevel gear and the cylindrical gear transmission can be considered as a simplified form of the hypoid gear transmission based on the construction features. For the above two kinds of gears, there will be certainly more than one implementing method of this invention with reference to the above mentioned first embodiment. But all of that involved in the conception of this invention should belong to the protective scope of present invention.

What is claimed is:

1. A method of measuring gear errors through meshing and separating wherein a specific master gear comes into meshing engagement with a measured gear during the course of transmission to measure gear individual error, the composite error and the interrelationship among the individual errors and composite errors, comprising following steps:
   (a) said measured gear being mounted on a driving spindle of a measuring machine as a driving gear and a specific master gear being mounted on a driven spindle as a driven gear (or alternatively, interchanged the two gears in mounting), said specific master gear with its teeth being arranged in accordance with a peculiar rule, the teeth of said specific master gear according to the features of the flank, comprising transmitting teeth and measuring teeth;
   (b) a procedure for fixing a measuring datum starting point of said specific master gear for making sure that in repeated mountings or one mounting for measuring many times the starting point for measuring and data processing will be unchanged;
   (c) said driving spindle being driven, through meshing engagement of the measured gear with the specific master gear, said driven spindle being driven to rotate;
   (d) two sensors which are respectively mounted coaxially with said measured gear and said specific master gear being effected by angular displacement to give signals, and then said two signals being synthesized and converted into non-uniformity signal errors of rotating angle;
   (e) then elements of said error signals being separated out and stored for data processing and combined output of said elements.

2. A measuring method according to claim 1 wherein said specific master gear comprises one kind of transmitting gear teeth and at least one kind of measuring gear teeth; for a specific master gear there may be only one kind of measuring gear teeth or may also be more than one kind of measuring teeth combined.

3. A measuring method according to claim 1 or 2 wherein the number of said transmitting teeth of said specific master gear should be as many as enough to assure the contact ratio not more than 1 during the measuring engagement, so as to have the effective portions of different measuring teeth to join in effective engagement without any mutual interference.

4. A measuring method according to claim 3, wherein there is no projecting narrow land reserved on the flank of said transmitting teeth, and the gear thickness of said transmitting teeth is thinned to such a degree that only driving action is effected but without any interference for other measuring teeth which will join in effective measuring engagement.

5. A measuring method according to claim 1 or 2 wherein there may be three kinds of measuring teeth on a specific master gear:
   one is the class A measuring gear tooth which reserves a complete tooth flank as datum gear tooth;
   another is the class B measuring gear tooth which possesses a complete projecting narrow land of tooth profile on the flank with the solid construction of the tooth;
   the third is the class C measuring gear tooth which possesses a complete projecting narrow land of tooth trace on the flank with the solid construction of the tooth.

6. A measuring method according to claim 5 wherein there may be at least one class B measuring teeth on a specific master gear, in case of more than one, the projecting narrow lands of the tooth profile on different teeth will take different positions along the tooth breadth, so as to separate the tooth flank into tooth profile lines on different sections for measuring the tooth profile error and representing the whole tooth flank.

7. A measuring method according to claim 5 wherein there may be at least than one class C measuring teeth on a specific master gear, in case of more than one, the projecting narrow lands of the tooth trace on different teeth will take different positions along the tooth depth, so as to separate the tooth flank into tooth trace lines at different tooth depth for measuring the tooth trace error and representing the whole tooth flank.

8. A measuring method according to claim 5 wherein on a specific master gear there is one class A measuring tooth, more than one class B measuring teeth and one class C measuring tooth.

9. A gear error measuring machine for carrying out the meshng and separating measuring method as in claim 1, comprising:
   a base assembly for supporting the whole measuring machine;
   two slide carriages which are mounted on said base assembly for adjusting the relative position between a specific master gear and a measured gear, with bearings for spindles mounted thereon;
   a driving spindle and a driven spindle which may rotate respectively in said bearings;
   said specific master gear and said measured gear which may mesh with each other are mounted respectively on one ends of said two spindles; two sensors are mounted respectively on the other ends of said two spindles for collecting the rotating angle signals of said two gears during the transmission;
   a device for fixing a starting datum point to make sure and guaratee said starting point unchanged during repated mounting of said specific master gear or in one mounting thereof for repeated measuring;
   a driving unit for driving said driving spindle, through the meshing engagement of said specific master gear with said measured gear, and then driving said driven spindle to rotate;
   an error signal processing device for combining and converting said rotating angle signals given by said two sensors into various gear error output signals;
   a graph output unit and a data output unit for converting said error signals from said error signal processing device into graphs and data.

10. A measuring machine according to claim 9 wherein said device for fixing said starting datum point is mounted on said driven spindle for said specific master gear.

11. A measuring machine according to claim 9 wherein said device for fixing said starting datum point is mounted on said sensor which is fixed co-axially with said specific master gear.

12. A measuring machine according to claim 9 wherein said device for fixing said starting datum point is mounted on a certain circumferential angle position of said specific master gear.

* * * * *